United States Patent
Madan et al.

(10) Patent No.: US 12,455,859 B2
(45) Date of Patent: Oct. 28, 2025

(54) EXTENT RESTORE PERFORMANCE USING SMART PREFETCHING

(71) Applicant: Dell Products L.P., Round Rock, TX (US)

(72) Inventors: Nitin Madan, Cupertino, CA (US); Kedar Godbole, Pune (IN); Srikant Viswanathan, Pune (IN); Bhimsen Bhanjois, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 110 days.

(21) Appl. No.: 18/364,625

(22) Filed: Aug. 3, 2023

(65) Prior Publication Data
US 2025/0045248 A1 Feb. 6, 2025

(51) Int. Cl.
*G06F 16/172* (2019.01)
*G06F 11/14* (2006.01)

(52) U.S. Cl.
CPC ........ *G06F 16/172* (2019.01); *G06F 11/1469* (2013.01); *G06F 2201/84* (2013.01)

(58) Field of Classification Search
CPC .............. G06F 16/172; G06F 11/1469; G06F 2201/84; G06F 16/17; G06F 11/14
See application file for complete search history.

(56) References Cited

U.S. PATENT DOCUMENTS

| | | | | |
|---|---|---|---|---|
| 10,572,452 | B1 * | 2/2020 | Singh | G06F 16/2246 |
| 11,150,826 | B2 * | 10/2021 | Madan | G06F 3/0611 |
| 2008/0270706 | A1 * | 10/2008 | Fair | G06F 3/061 |
| | | | | 711/137 |
| 2022/0237084 | A1 * | 7/2022 | Bhagi | G06F 11/2097 |

FOREIGN PATENT DOCUMENTS

WO WO-2008134004 A1 * 11/2008 ............. G06F 3/061

\* cited by examiner

*Primary Examiner* — Maher N Algibhah
(74) *Attorney, Agent, or Firm* — Staniford Tomita LLP

(57) ABSTRACT

Improving read performance using pre-fetches by encoding an extent map identifying valid data of the file as extents that may be interspersed with holes constituting invalid data, and storing the extent map in the client. The extent map generates pre-fetches of data that land on only extents of the file and avoids the holes, by one of: transferring, upon the read request, the extent map to a filesystem storing the file, and bringing the extents from the extent map into memory ahead of the read request; or using, in the network client, the extent map to generate prefetch requests and execute read-ahead operations on the filesystem. The method may also apply where the application only wants to read what has changed since the last backup. In this case, the application has a map of what has changed, and can choose to read just the right extents.

13 Claims, 9 Drawing Sheets

EXTENT RESTORE PERFORMANCE USING SMART PREFETCHING

TECHNICAL FIELD

Embodiments relate generally to deduplication storage systems, and more particularly to systems and methods for improving extent restore performance using smart prefetching.

BACKGROUND OF THE INVENTION

Data is typically backed up by copying the data from a data source to a data target or storage device or network. Data deduplication is a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. Though storage requirements are greatly reduced, processing overhead is increased through the processes of deduplication.

Data restores involve moving stored data from the storage target back to the data source or active tier after a data loss event on the data source. In a typical filesystem, the restore operations are aided by a read-ahead (prefetch) mechanism. The simplest form of prefetching is a read hint issued at a certain horizon from the read offset. A single read request typically issues a single prefetch request at an offset calculated from the read offset and prefetch horizon. As an example, if the read comes in at an offset 0 MB, the prefetch request is issued at the 0 MB+prefetch horizon MB. Typically, the prefetch horizon is a few MB. It is higher in the scenarios where the underlying storage layer is slower. This mechanism generally works well since the application read requests mostly find all their data already present in the read-ahead cache, and therefore need not block for I/O operations, thus considerably improving read performance.

Many applications do not read out the full files, but instead read only specific sections of a file, referred to as 'extents' of the file. Each extent is identified by its starting offset and length. Reading multiple extents from a file involves jumping from one offset to another. In this case, prefetching has limited usefulness since each jump from a current extent to the next extent means that prefetching must start again for the next extent. Furthermore, the prefetching I/Os that were issued beyond the end of the current segment are wasted.

What is needed, therefore, is a method of instructing the filesystem to prefetch the exact regions that will be read out. What is further needed is a method to enable the filesystem to identify the extents in certain use-cases.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and DDBoost are trademarks of Dell EMC Corporation.

BRIEF SUMMARY OF EMBODIMENTS

Embodiments are directed to a method for improving read performance of a file using data pre-fetches, by (in part): encoding an extent map identifying valid data of the file as extents interspersed with one or more holes constituting invalid data, storing the extent map in a network client executing an application, wherein the application produces a read request to access the file from storage, and transferring, upon the read request, the extent map to a filesystem storing the file. The filesystem brings the extents from the extent map into memory ahead of the read request, and generates pre-fetches of data on the file that land on only extents of the file and avoiding the holes.

The pre-fetches move data from a prefetched extents into a read-ahead cache to be sent to the application in response to the read request, and the prefetch may be used as a hint that a read input/output (I/O) operation is imminent for purposes of filling the read-ahead cache and preventing a need to issue a blocking I/O operation for the read request.

The filesystem may include a multi-streamed restore component providing multiple streams to issue read-ahead operations for the pre-fetches in parallel, and the pre-fetches move the data into the read-ahead cache using the multiple streams.

Embodiments are yet further directed to a method for improving read performance of a file using data pre-fetches, by (in part): encoding an extent map identifying valid data of the file as extents interspersed with one or more holes constituting invalid data, storing the extent map in a network client executing an application, wherein the application produces a read request to access the file from storage. The network client then uses the extent map to generate prefetch requests and execute read-ahead operations on a filesystem storing the file, and generates pre-fetches of data on the file that land on only extents of the file and avoiding the holes.

BRIEF DESCRIPTION OF THE DRAWINGS

In the following drawings, like reference numerals designate like structural elements. Although the figures depict various examples, the one or more embodiments and implementations described herein are not limited to the examples depicted in the figures.

DETAILED DESCRIPTION

Figure 1:
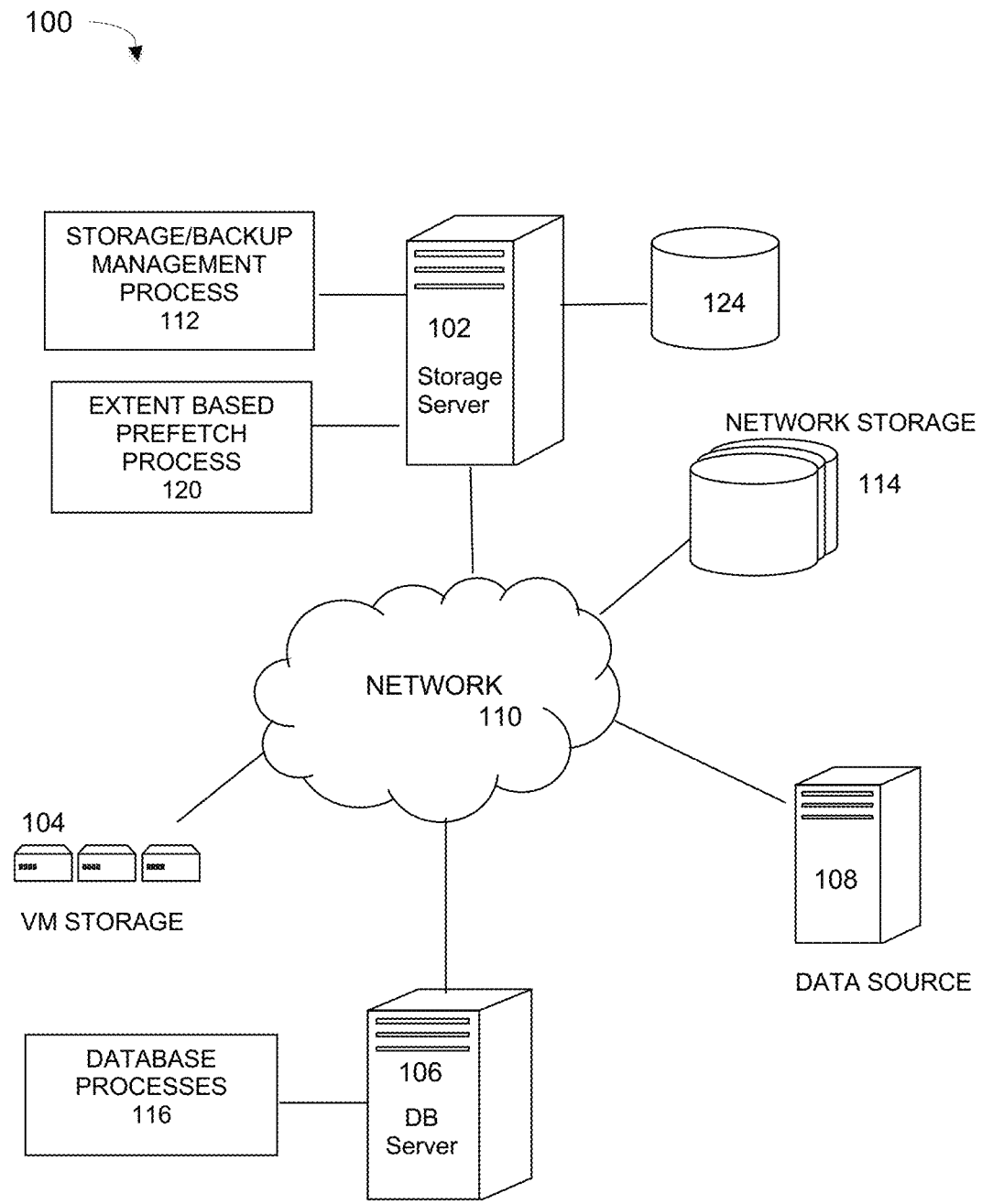
FIG. 1 is a diagram of a computing network implementing a file locality-based prefetch process in a deduplication storage system, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software and systems deployed in a distributed system, such as a cloud based network system or very large-scale wide area network (WAN), metropolitan area network (MAN), however, those skilled in the art will appreciate that embodiments are not limited thereto, and may include smaller-scale networks, such as LANS (local area networks). Thus, aspects of the one or more embodiments described herein may be implemented on one or more computers executing software instructions, and the computers may be networked in a client-server arrangement or similar distributed computer network.

Embodiments are described for a process for improving file restores in deduplication backup systems. FIG. 1 illustrates a computer network system that implements one or more embodiments of a data processing and storage network system implementing an improved file restoration process using extent-based prefetching, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source maybe a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

In general, Data Domain is a purpose-built backup appliance providing streaming deduplication that is able to ingest data at full network speeds, from multiple backup sources while providing storage efficiency. Present Data Domain systems are able to use tiered data storage technologies, such as very large multi-terabyte SATA drive trays, or SSD-enabled fast ingest trays.

The Data Domain (DDFS) is an inline data deduplication filesystem. As data gets written to the filesystem, DDFS breaks it into variable sized segments and a group of segments are packed in a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated file-system that forms segments from data, these segments are uniquely identified by their key/label called as fingerprint. Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

A file in DDFS is represented by a Merkle tree, with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate containers, known as L0 and Lp containers.

Figure 2:
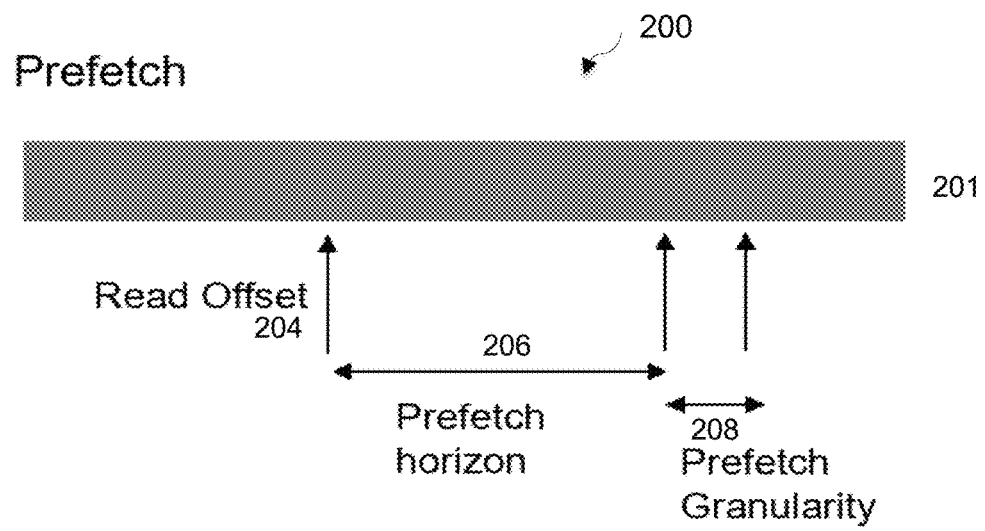
FIG. 2 illustrates a prefetch operation that is adopted for use with an extent-based prefetch process, under some embodiments.

As mentioned in the background section above, in a typical filesystem (e.g., DDFS), data restores are aided by a read-ahead (prefetch) mechanism, such as a read hint issued at a certain horizon from the read offset. A single read request typically issues a single prefetch request at an offset calculated from the read offset and a set prefetch horizon. FIG. 2 illustrates a prefetch process that is adopted for use with a locality-based prefetch process to improve file restores, under some embodiments. FIG. 2 shows certain prefetch parameters defined for a horizontal axis 201 denoting memory capacity in megabytes (MB), or any similar unit of storage). As shown in FIG. 2, for a prefetch request issues at a point after an application's read request as defined by a read offset 204 and a prefetch horizon 206. As shown in the example scenario of diagram 200, a read comes in at a read offset 0 MB, and a prefetch request is issued at the 0 MB plus the prefetch horizon value in MB. Typically, the prefetch horizon 206 is on the order of 30 MB or so (e.g., between 15 to 50 MB), and is higher when the underlying storage layer is slower, although any value is possible.

The prefetch granularity 208 shown in the example of FIG. 2 is on the order of 1 MB for a prefetch horizon of 30 MB. The prefetch granularity is the size of the prefetch I/O operation. In large sequential reads, it is typically 1 MB for one example, though other sizes are also possible. Likewise, the read offset 204 is typically 0, but can be any other practical value.

The prefetching operation 200 can be for any file or data restore process that comprises an application issuing a file open request followed by a plurality of read and write requests and a file close. In this context, the prefetch 200 moves data from a prefetched file into a read-ahead cache to be sent to a read request consumer of the filesystem. Any similar operation that uses a prefetch mechanism as a hint to indicate upcoming reads may also be used.

Without the benefit of a prefetch process 200, each read request becomes a blocking read (i.e., block pending I/O operations), and is limited by the backend storage performance, thus at least some degree of data pre-fetching is usually desired to reduce I/O blocking and improve file restore performance.

As read operations copy data out from memory, the prefetches 200 do the actual work of reading data from the storage layer. As the reads periodically catch up with the prefetches, these reads block I/Os until the data becomes available. During this time, however, the prefetches that have been issued out already by the previous reads get time to perform their I/Os and load data into memory. This ensures that the subsequent read requests do not block I/Os until a read again catches up with the prefetch. This cycle continues throughout the restoration of a file, and since most of the reads are getting served out of memory, throughput improvement is significant at least in the case of relatively long 'read highways.'

Figure 3:
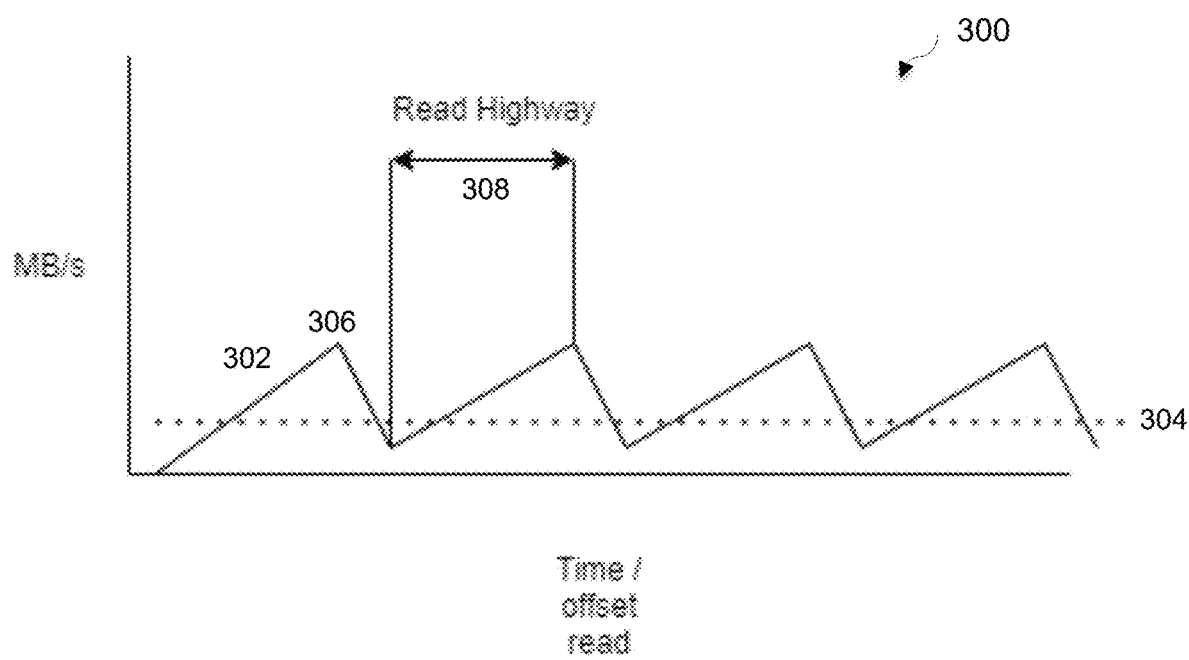
FIG. 3 illustrates an example plot of a read highway formed by slow and fast reads in a data restore system.

As mentioned, prefetches at the prefetch horizon bring data into memory just as application reads catch up, which happens frequently due to slow disk I/O, and other factors. FIG. 3 illustrates an example plot of slow and fast reads for a system that accesses both fast memory and slow disks. FIG. 3 illustrates a graph 300 over a Y-axis measuring data transfer throughput in MB/s, and an X-axis measuring Time/offset read. The dimensions of graph 300 demonstrate that sequential read requests come to the ordered increased offsets for the file, i.e., the file is being read from offset 0 till the end of the file. This is also happening with a monotonically increasing clock.

As shown in FIG. 3, the graph between I/O being read out of memory and read off the disk (i.e., fast reads versus slow reads) appears as a sawtooth pattern plot 302. As a result, the average read performance (304) is a fraction of the peak read performance 306. Here, the distance between the time spent between the stalls is defined as a read highway 308. The system's restore performance is directly proportional to the length of the read highway, and the key to good sequential read performance is to keep the read highways as long as possible.

Extent-Based Reads

Figure 4:
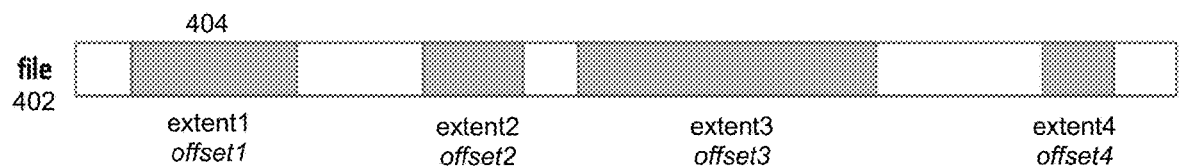
FIG. 4 illustrates an example of extent-based reads.

Certain use-cases require the application to perform extent-based reads, rather than sequential reads of the entire file. Extent-based reads involve reading several regions of the file sequentially but the regions themselves are not contiguous. FIG. 4 illustrates an example of extent-based reads. As shown in FIG. 4, portions 404 represent extents that are read from the file 402.

Figure 5:
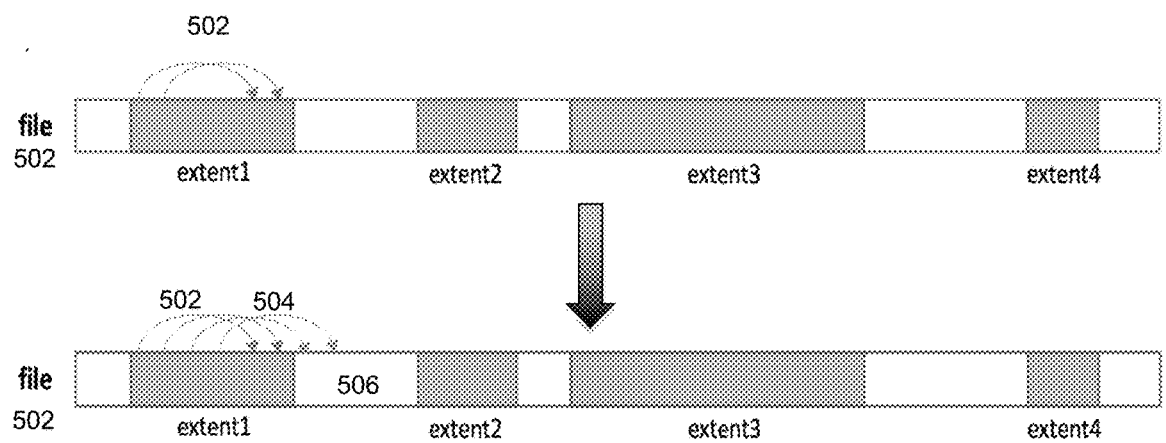
FIG. 5 shows an example prefetch offset corresponding to a read offset.

In general, a naïve prefetching mechanism based on a simple prefetch horizon does not work effectively for extent-based reads, as shown in FIG. 5. FIG. 5 shows an example prefetch offset corresponding to a read offset. For the example of FIG. 5, a prefetch is illustrated as an curved arrow for a read starting within an extent and going forward in the file. As shown for file 502, the beginning of the curved arrows 502 indicate the offset of the read while the end of the arrow indicates the prefetch offset calculated based on the prefetch horizon, where prefetches corresponding to the first two reads fall inside the same extent, i.e., extent1.

In a simple prefetch, the prefetches corresponding the next few reads may fall beyond the extent and into a gap in the file that the application is not interested in reading. This results in wasteful I/Os and does not load up the initial part of the next extent that the application is next going to read. This can be seen in FIG. 5 where the prefetches 504 for the next two reads (after 502) fall within gap 506 and not extent2.

Figure 6:
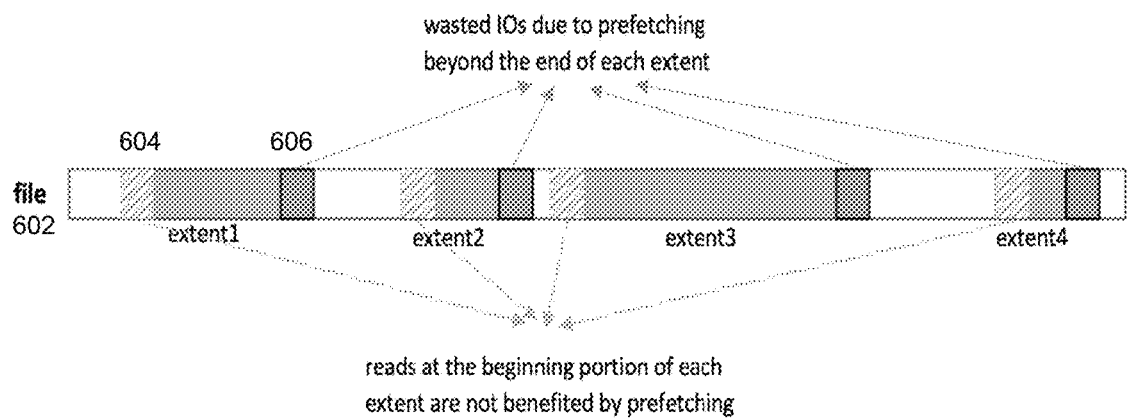
FIG. 6 illustrates issues of pre-fetching that are remedied with an extent-based prefetching mechanism, under some embodiments.

A present, non-extent-aware prefetching mechanism is thus ineffective due to the fact that (1) the prefetch IOs issued beyond the end of an extent are wasteful I/Os and the prefetched data is not used at all, and (2) the reads at the beginning of each extent do not benefit from any kind of prefetching as the prefetching mechanism is operating further down the extent. These situations are shown in FIG. 6 for file 602. FIG. 6 illustrates issues of pre-fetching that are remedied with an extent-based prefetching mechanism, under some embodiments. As shown in FIG. 6, an end region 606 of each extent produces wasted I/Os due to prefetching beyond the end of an extent (as shown in FIG. 5), and reads from a beginning region 604 of each extent are not benefitted by prefetching.

Embodiments of the extent-based prefetching process 120 use a recipe that represents the set of extents to be read from a file. A recipe basically consists of a sequence of offsets that identifies an extent. Thus, for the example shown in FIG. 4, the first extent (extent1) is denoted offset1, the second extent (extent2) is denoted offset2, the third extent (extent3) is denoted offset3, and so on.

Figure 7:
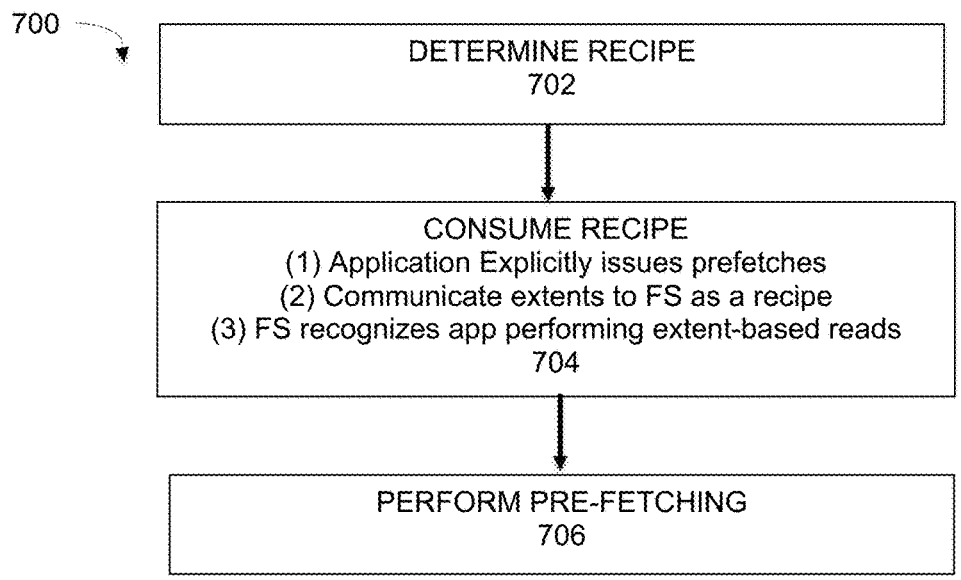
FIG. 7 is an flowchart illustrating an overall process of extent-aware prefetching, under some embodiments.

FIG. 7 is an flowchart illustrating an overall process 700 of extent-aware prefetching, under some embodiments. Process 700 performs three fundamental steps of determining the recipe 702, consuming the recipe 704, and performing extent-aware pre-fetching 706.

The read recipe is a set of extents that the application must read. These offset/len pairs determine the logical sections of the backup file. The recipe can be determined for step 702 from the application, or it can be generating using differences between backups.

Certain applications (e.g., Dell Technologies' Cloud Snapshot Manager, CSM) store the extents as part of the backup. In this case, the application takes the backups of VM images, and this VM image may have lots of holes or gaps. Traditionally, filesystems are configured to return 'O' when the holes in the files are read. If the recipe is used for reading the VM image, the holes can be skipped to be read. Furthermore, the restored VM image would continue to be a "thin provisioned" image. Other applications (e.g., vProxy) also store the extent map of the VM.

With respect to generating a recipe using differencing, backups are written in generations (or versions). A difference ('diff') between subsequent generations of backups yields the changes in the files. These diffs can be represented as set of offset/len pairs. Many filesystems have utilities or APIs that can be used to generate the diffs between any two files.

To determine and use the recipe for step 704, there are three different approaches representing distinct workflows. The first (1) is that the application explicitly issues the prefetches using a novel recipe-based (i.e., extent-aware) prefetching mechanism that smartly issues prefetches to the filesystem based on the offsets of the incoming reads, the prefetch horizon and the recipe. The second (2) is that the extent information is communicated to the filesystem as a recipe, and the filesystem internally fires the prefetches using a novel recipe-based mechanism based on the offsets of the incoming reads, the prefetch horizon and the supplied recipe. The third (3) is that the filesystem recognizes the intention of the application to perform extent-based reads and manages the prefetching internally using a novel recipe-based mechanism.

Figure 8:
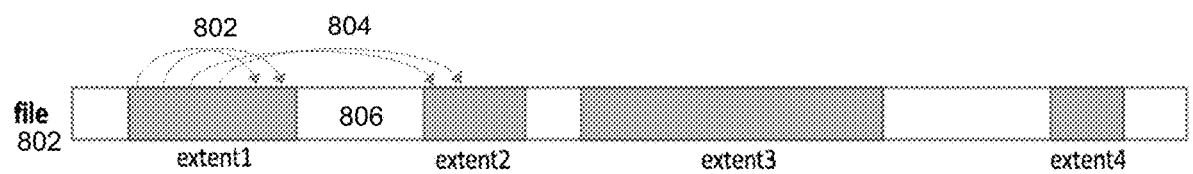
FIG. 8 illustrates an extent-based prefetch process using a recipe-based prefetching mechanism to skip gaps and calculate the prefetch offsets correctly, under some embodiments.

With respect to step 706, the prefetch offset calculation is extent-aware and skips over holes such that the prefetch offset always falls inside an extent. This ensures that there are no wasteful prefetch I/Os. This is shown in FIG. 8, where the extent-based prefetch process using a recipe-based prefetching mechanism skips the holes and calculates the prefetch offsets correctly. As shown in FIG. 8, the prefetches 802 corresponding to the first two reads fall inside the same extent, i.e., extent1, while the prefetches 804 corresponding to the next two reads fall inside the next extent, i.e., extent2 correctly, as opposed to falling in the gap 806, or any other gap.

In an embodiment, the recipe-based prefetching mechanism can be implemented in two different ways. The first is a simple recipe-based prefetching mechanism, and the second is a recipe-based multi-stream restore (or read) mechanism (MSR). For the simple recipe-based prefetching mechanism, the filesystem must be aware of the file being read as a porous (holey) file. As the file is being read, the prefetches to the file correspond to the valid data regions, and not to any gaps.

The second method uses MSR, which is an aggressive read-ahead mechanism for improving performance of reads by using multiple streams to issue read-ahead operations in parallel. MSR opens multiple internal streams for each external read stream and uses a read-ahead cache to serve the user I/Os. The benefits of this method are a larger read ahead cache (that results in longer read runways), and increased parallelism, which avoids longer queues (and queue delays) in the bottom layers.

The multi-stream restore process divides the offset range to be read into multiple chunks and assigns one chunk to each internal thread which is operating on its own internal stream. Each internal thread issues read aheads to populate the internal cache while also issuing prefetches on the subsequent chunk that it will soon read. The prefetch offset calculation considers the chunk-based division among the internal threads and appropriately calculates the prefetch offset for each stream. Note that these calculations assume strictly sequential reads. It should be noted, however, that these calculations will fail if the reads are extent-based, since both the read-aheads and prefetches may fall outside extents.

Embodiments include a novel recipe-based MSR for boosting performance of extent-based reads. Recipe-based MSR calculates the read-ahead and prefetch offsets for each internal thread/stream by factoring in the recipe into the calculation. When the application supplies the recipe to the filesystem, recipe-based MSR will be triggered in the filesystem, and MSR will continue to use the recipe information for aggressive prefetching until all the extents are read. Alternatively, recipe-based MSR may be implemented on the application side itself wherein the MSR read-aheads and prefetches are fired from the application based on the recipe information.

Figure 9:
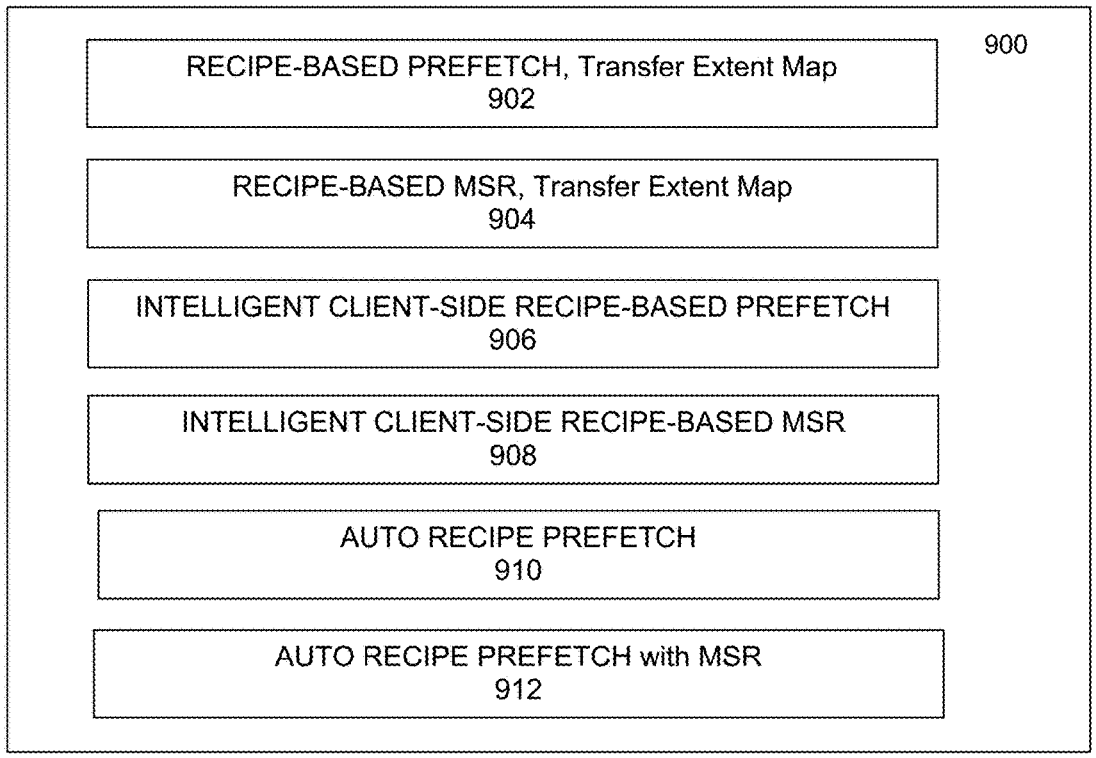
FIG. 9 is a diagram that lists six different ways of performing prefetch-based or MSR-based prefetching using file extents, under some embodiments.

The two main methods of prefetching or MSR mechanisms, along with the three methods of consuming the recipe as shown in 704 yield six different extent-based prefetch methods. These six combinations are shown in FIG. 9, which lists these methods as recipe-based prefetching with extent map transfer 902, recipe-based MSR with extent map transfer 904, intelligent client-side recipe-based prefetching 906, intelligent client-side recipe-based MRS 908, auto-recipe prefetching 910, and auto-recipe prefetching with MSR 912.

Figure 10:
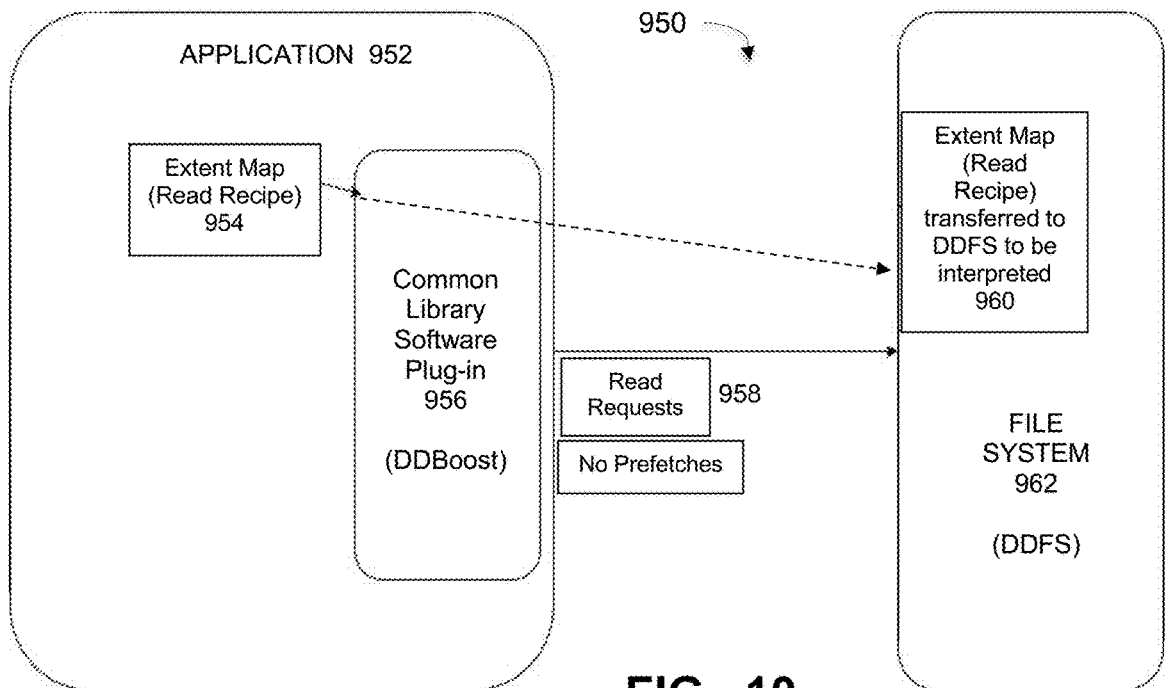
FIG. 10 illustrates the use of transferred extent maps for recipe-based prefetching, under some embodiments.

For the recipe-based prefetching with extent map transfer 902, the application knows about the extents that must be read. This extent information is then sent or transferred to the server. FIG. 10 illustrates the use of transferred extent maps for recipe-based prefetching, under some embodiments. As shown in FIG. 10, an application 952 of system 950 performs read operations through read requests 958 to a filesystem 962. The application 952 provides an extent map 954 that is interpreted as the read recipe. The filesystem 962 would interpret this read recipe to bring the right extents in memory (ahead of the I/O request), 960. In its simplest form, the extents would be prefetched at a prefetch read horizon, accommodating for the holes in the I/O path.

Figure 13:
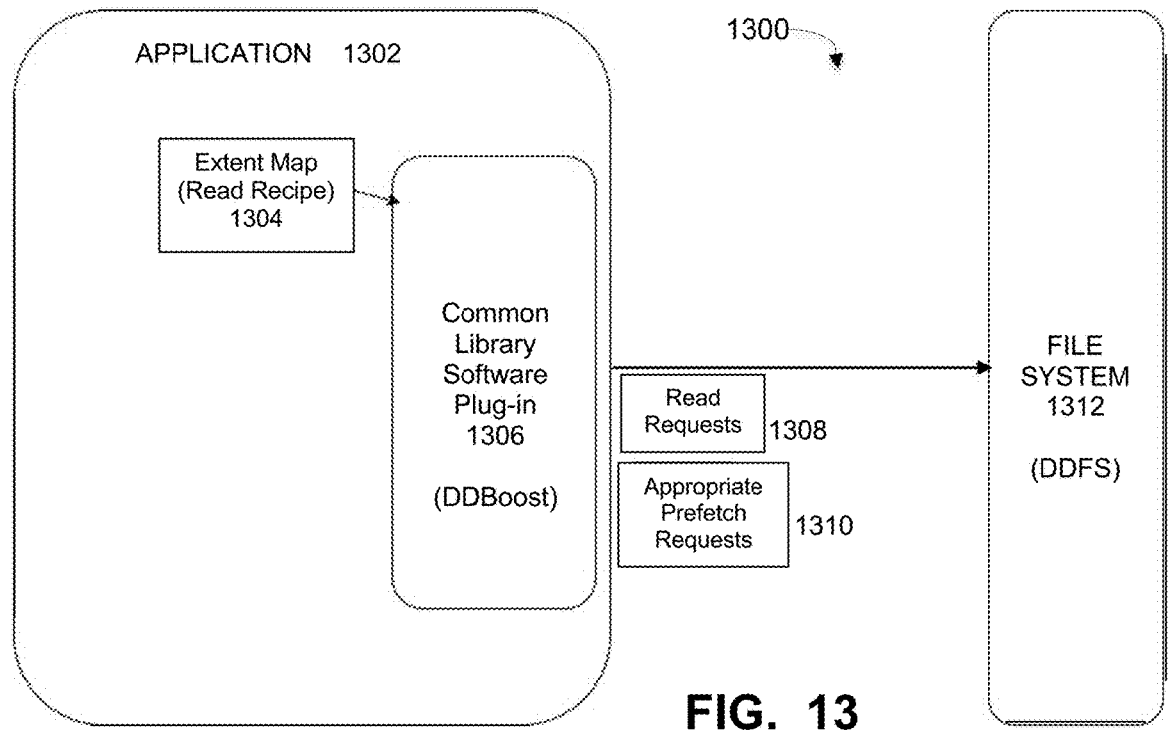
FIG. 13 illustrates the use of client-side, recipe-based prefetching used for extent-based prefetches, under some embodiments.

For the example of FIG. 10, the read requests are sent through a common library software plug-in 956, or similar interface, to access the files in the filesystem 962, which could be a Data Domain filesystem (DDFS). In this case, the plug-in 956 can be implemented using DDBoost, which utilizes TCP/IP connections as directed by backup software. When enabled with DDBoost, as shown in FIG. 13, the application 1302 becomes a "DDBoost client."

For this embodiment, the DDBoost client (application) 952 does not do any prefetches by itself, as the extent map 954 by itself is the prefetch request. Some examples of applications that utilize this method are: CSM (cloud snapshot manager) and CDR (cloud data restore). One benefit of this mechanism is that it allows the destination volume (on filesystem 962) to remain thin-provisioned.

As shown in FIG. 9, a variant of the recipe-based prefetch is a recipe-based MSR method where the extent map is available from the application and transferred to the filesystem, 904. For this embodiment, the filesystem is assumed to have the ability to read multiple streams in parallel using MSR.

Figure 11:
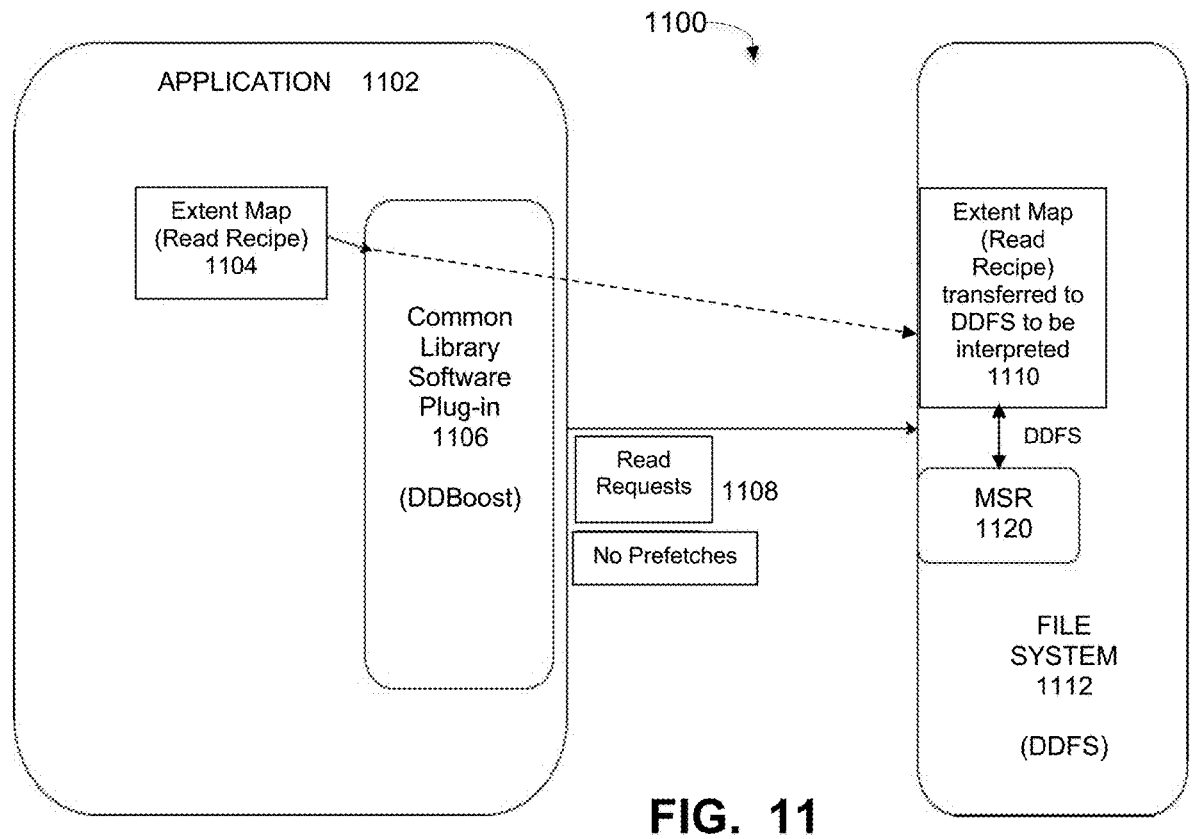
FIG. 11 illustrates the use of transferred extent maps for recipe-based MSR read-aheads, under some embodiments.

FIG. 11 illustrates the use of transferred extent maps for recipe-based MSR read-aheads, under some embodiments. As shown in FIG. 11, application 1102 performs read operations through read requests 1108 to DDFS 1112. The application 1102 provides an extent map 1104 that is interpreted as the read recipe. The filesystem 962 would interpret this read recipe to bring the right extents in memory (ahead of the I/O request), 1110. As with the system of FIG. 9, the read requests are sent to DDFS 1112 using the DDBoost plug-in 1106.

For the embodiment of FIG. 11, client 1102 of system 1100 does not do any prefetches by itself, as the extent map 1104 by itself provides the basis for the prefetches, and MSR component 1120 would prefetch and serve the extents intended to be read.

Figure 12:
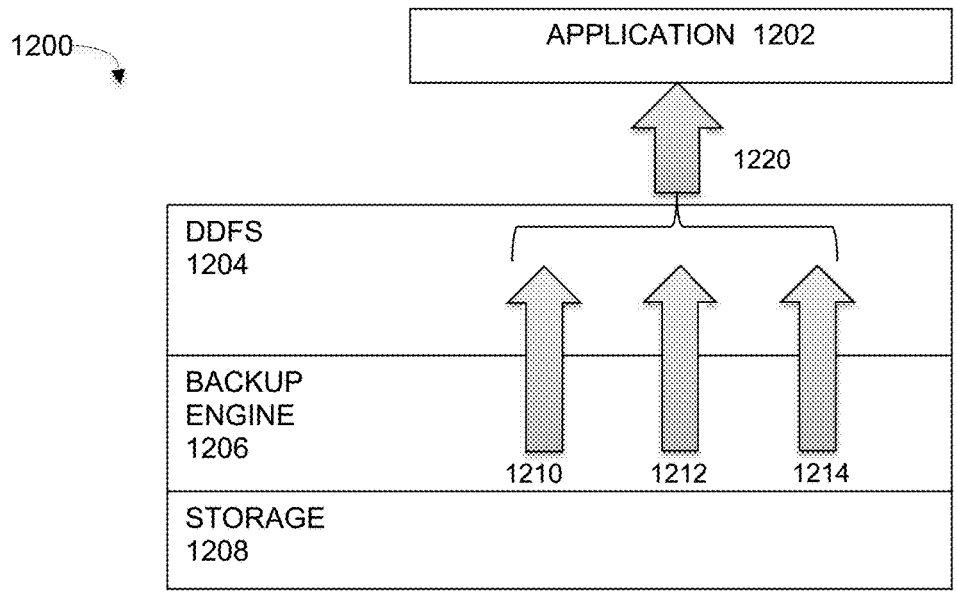
FIG. 12 illustrates an MSR process for use in an extent-based prefetch system, under some embodiments.

The MSR component 1120 performs multi-stream read operations in order to speed up read loads from storage tiers (e.g., active, cloud, etc.) for larger files. In this case, if the backup application only uses a single stream to read from the file, the DDFS 1112 internally reads the file by using several threads in parallel, thereby returning the data to the backup application faster than if the file was read through a single sequential process. FIG. 12 illustrates an MSR process for use in an extent-based prefetch system, under some embodiments. As shown in FIG. 12, system 1200 comprises a filesystem (DDFS) 1204, with backup engine 1206 and storage layers 1208. Read requests from application 1202 access the storage 1208, and in return, data is read back through multiple streams 1210, 1212, and 1214 between the backup engine 1206 and the filesystem 1204. These can form a single data stream 1220 back to the application 1202, or the multiple streams can be sent separately as well back to application 1202, depending on the configuration of the read requests and data read threads.

The MSR feature 1200 is configured to turn a single internal read thread into multiple parallel internal threads, such as shown for threads 1210, 1212, and 1214. For this embodiment, the filesystem MSR process 1120 internally create a number of streams (typically 4 or 8) for non-overlapping file offsets, which read from the file in parallel, so that the external stream 1220 is fed with data sequentially, and typically at a much faster speed than if the read occurred using a single internal stream. The number and size of each stream may vary depending on systems resources and constraints.

The MSR process 1120 is typically configured to work with applications and read operations that request data of a certain size or rate. Thus, it may be configured to work for sequential reads for files larger than 8 GB and only after at least 500 MB of the file had been read to start with. These are example values only, and any other data amount may be possible to act as a condition or trigger threshold to determine if MSR is applicable to the ongoing read or not. For this embodiment, when a single-streamed read for a file lands in the DDFS 1112, the heuristics for MSR 1120 analyze the read and will proceed to see if the file is larger than the minimum (e.g., 8 GB by default), if at least 500 MB (or other amount) of the file has been read sequentially, and if the system is not loaded enough for MSR spawning additional sub-threads not putting performance at risk. Other similar conditions may also be defined, and generally non-sequential reads are not processed using MSR 1120.

System 1100 may also be configured such that during the lifetime of the external read, internal threads may complete reading from their pre-assigned offsets and move on to ones further in the file being read. Also, MSR 1120 continuously monitors for system load and read activity on the file, so that if either the file reads stop or the system load goes higher, it may tear down the internal threads, and leave the file read with the single external thread it would have had on a non-MSR system.

In both the systems 950 and 1110, the extent map can be large, and must be transferred and hosted by the filesystem. If the extent map is too big, and the filesystem is hosting the extent map in memory, the extent map can be transferred in metadata chunks as the read operations proceed. If the extent map is stored as a file on the filesystem, the path to the extent map file must be passed to the filesystem, so that the extent map could be processed.

As shown in FIG. 9, the third method of extent-based prefetching in list 900 is intelligent client-side, recipe-based prefetching 906. For this embodiment, the filesystem is not aware of the extent map as it is not provided by the application as part of the read recipe, as it is with methods 902 and 904.

FIG. 13 illustrates the use of client-side, recipe-based prefetching used for extent-based prefetches, under some embodiments. As shown in FIG. 13, an application 1302 of system 1300 performs read operations through read requests 1308 to a filesystem 1312.

The application 1302 provides an extent map 1304 that is interpreted as the read recipe. The filesystem 1312 would interpret this read recipe to bring the right extents in memory (ahead of the I/O request), 1308. Because the DDBoost client 1302 is aware of the extent map, the prefetch I/Os can intelligently skip over the holes. Thus, the extents of the extent map 1304 are prefetched at a prefetch read horizon, accommodating for the holes in the I/O path.

In DDBoost configuration 1306, the application as a DDBoost client 1302 owns the extent map 1304 and itself reads ahead appropriately to avoid the file holes. It thus sends only appropriate pre-fetch requests 1310 to the filesystem, and the filesystem need not do any extent-based processing itself. This also saves the filesystem the effort of receiving and hosting the transferred extent map.

Figure 14:
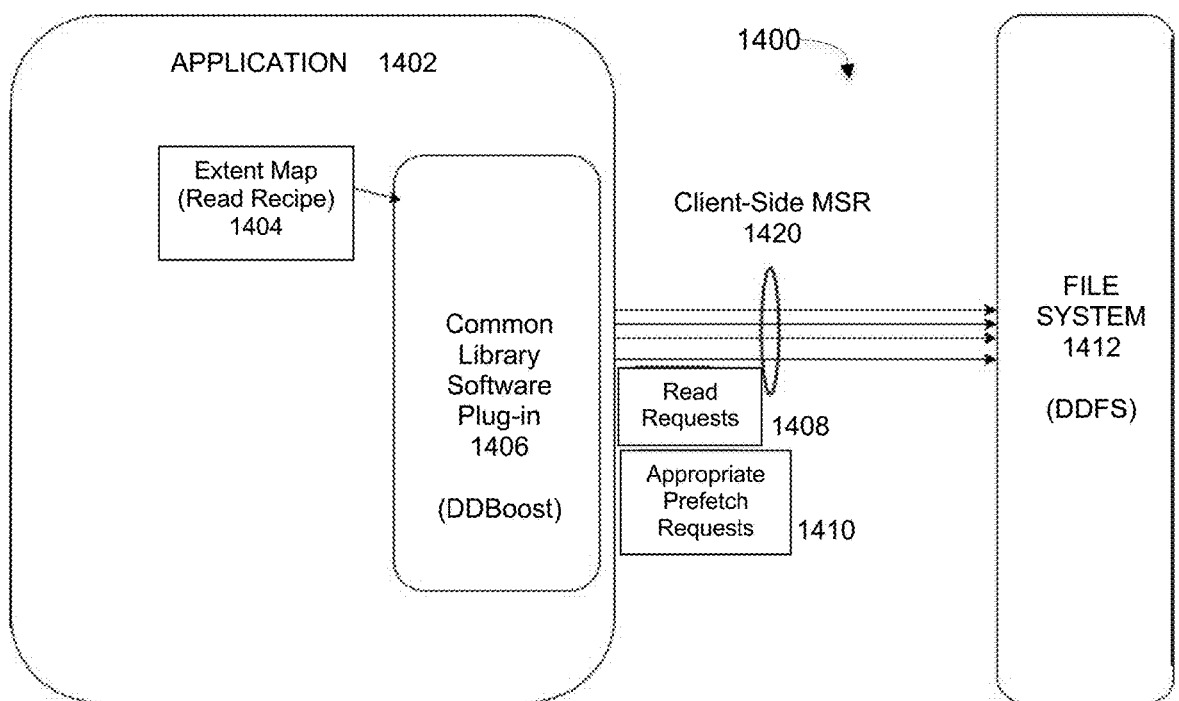
FIG. 14 illustrates the use of client-side, recipe-based MSR read-aheads, under some embodiments.

In an embodiment, system 1300 of FIG. 13, can be configured to utilize MSR by giving explicit instructions about which extents to get in its cache. FIG. 14 illustrates the use of client-side, recipe-based MSR read-aheads, under some embodiments. In the embodiment of system 1400, the DDBoost client 1402 opens multiple streams 1420 for the same file, in a client-based multi-streamed restore operation. As before, the extent map 1404 comprises a read recipe that is used directly by the client 1402 to formulate read requests that avoid pre-fetches to holes in the file for transmission through DDBoost 1406 to filesystem 1412. The read 1408 and prefetch 1410 request flow over the multiple TCP connections 1420, and the reads would be served out of a read-ahead cache on the DDBoost client 1402. As before, the DDBoost client 1402 is aware of the extent map, so the prefetch I/Os can intelligently skip over the holes. Using the MSR mechanism allows system 1400 to have the advantage of using the multiple streams 1420 as combined with the intelligence of the extent map 1404. The filesystem would faithfully serve the I/O requests, and would not need to prefetch anything at its end.

Figure 15:
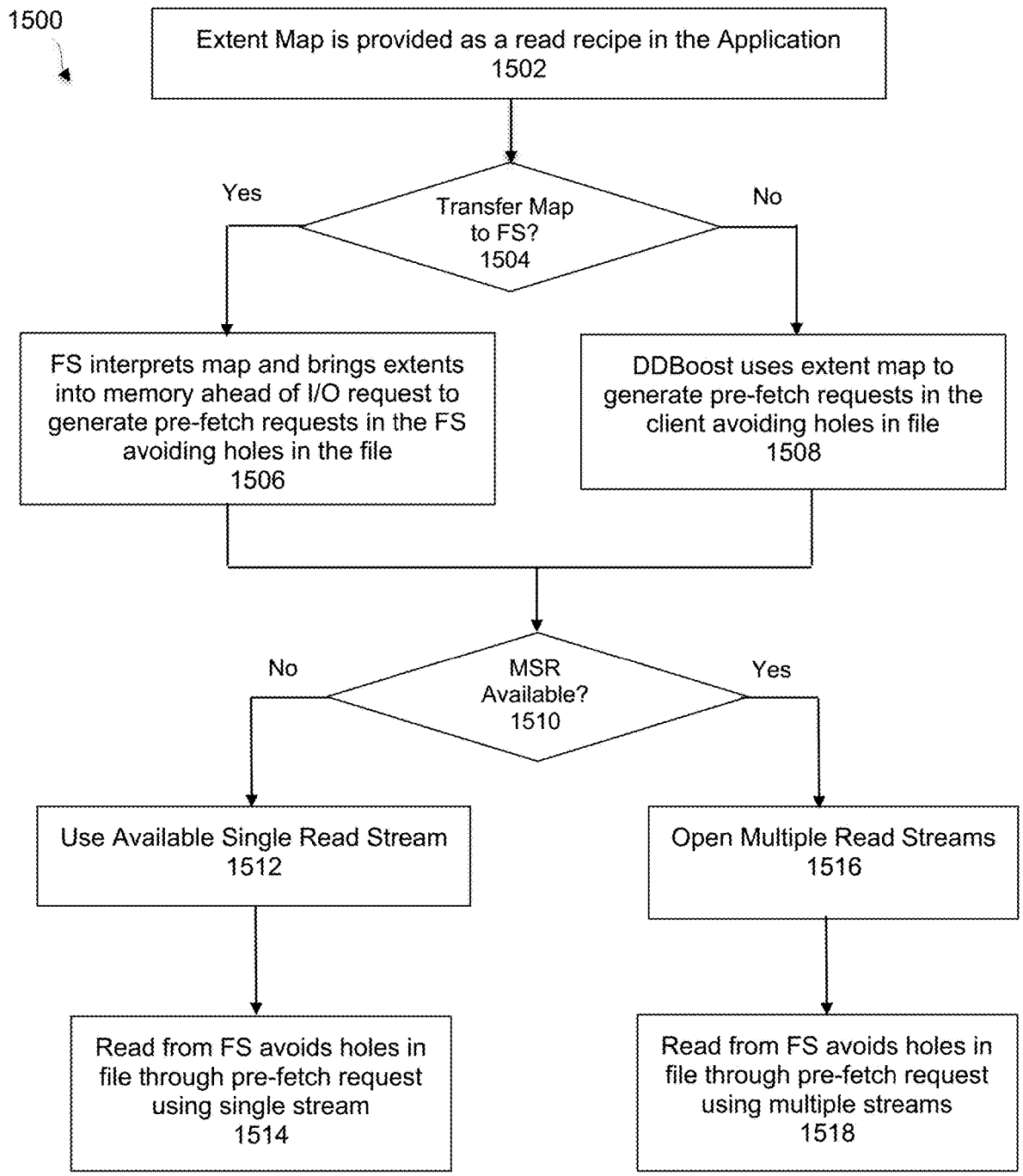
FIG. 15 is a flowchart that illustrates a method of improving extent restore performance by smart prefetching, under some embodiments.

FIG. 15 is a flowchart that illustrates a method of improving extent restore performance by smart prefetching, under some embodiments. The method 1500 encompasses the methods 902, 904, 906, and 908 of FIG. 9 in a single flow. As shown for each of these methods, and in FIGS. 10, 11, 13, and 14 respectively, an extent map is provided as a read recipe in the application, 1502. The extent map identifies and delineates the gaps or holes within a file, as shown in the example of FIG. 4. This recipe is then used by either the application itself or by an intelligent client-side process to produce pre-fetches that avoid the identified holes.

In decision block 1504, it is determined whether to transfer the recipe (extent map) to the filesystem, or use it in the application, as in FIGS. 13 and 14). If the extent map is transferred to the filesystem, the filesystem interprets the map and brings the extents into memory ahead of the I/O request, 1506 (as shown and described in FIGS. 10 and 11). The filesystem then generates the pre-fetch requests in a way that avoids holes in the file, as marked by the transferred extent map.

If, in step 1504, it is determined that the extent map is not transferred to the filesystem, the DDBoost layer in the client itself uses the extent map to generate prefetch requests that avoid holes in the file, as identified by the map, 1508 (as shown and described in FIGS. 13 and 14).

As described previously, in some systems, MSR may be available to improve the performance of read operations by using multiple streams to issue read-aheads in parallel. In decision block 1510 it is determined whether or not MSR is available. If not, the single read stream between the application (DDBoost client) and the filesystem is used, 1512. The application then reads from the filesystem using this single stream 1514, where the filesystem has either utilized pre-fetches using the transferred extent map (per step 1506), or the pre-fetches generated in the client by the DDBoost layer (per step 1508).

If, in step 1510, it is determined that MSR is available, the system opens the multiple read streams per the configuration of the MSR feature, 1516. The application then reads from the filesystem using these multiple streams 1518, where the filesystem has either utilized pre-fetches using the transferred extent map (per step 1506), or the pre-fetches generated in the client by the DDBoost layer (per step 1508).

Embodiments have been described with application to 'holey' files or files with gaps, but embodiments are not so limited. Other embodiments may include a use case where the application only wants to read what has changed since the last backup. If the application has a map of what has changed, it can choose to read just the right extents. In that case, while the restores will be extent based, and there may or may not be gaps in the backup file.

Embodiments of the processes and techniques described above can be implemented on any appropriate backup system operating environment or filesystem, or network server system. Such embodiments may include other or alternative data structures or definitions as needed or appropriate.

Figure 16:
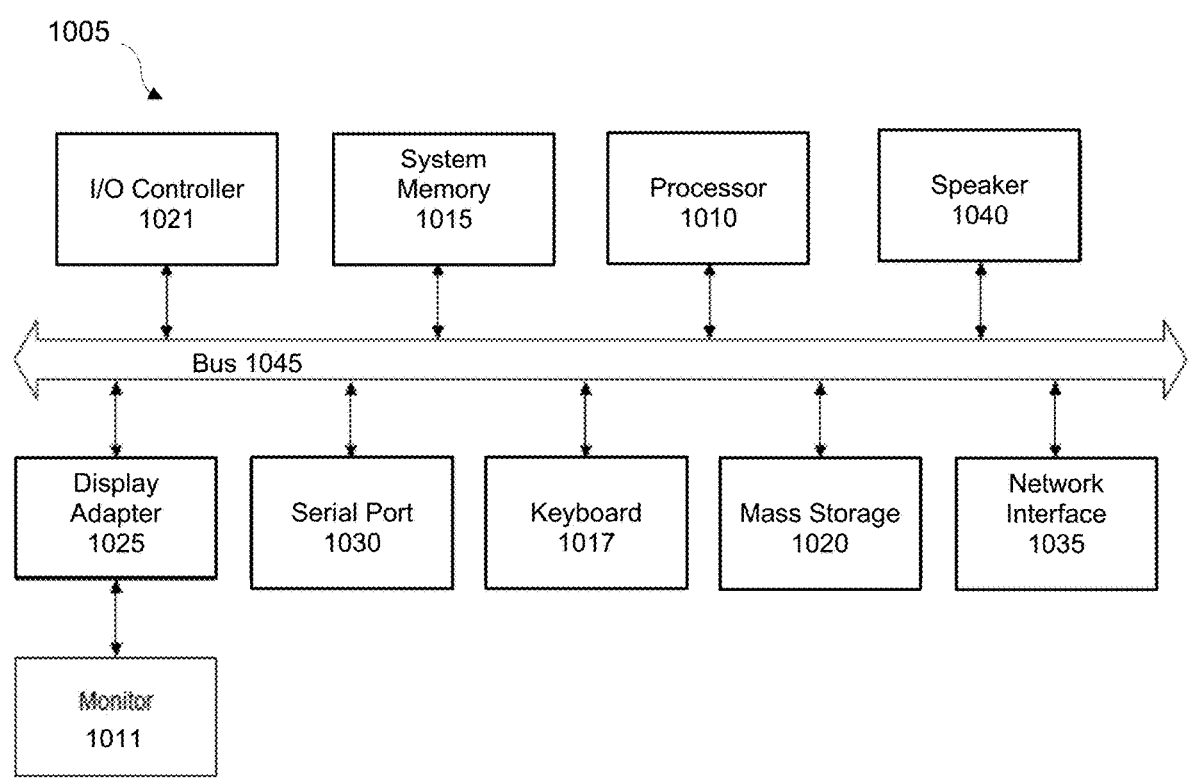
FIG. 16 is a system block diagram of a computer system used to execute one or more software components of the file locality-based prefetch process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 16 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for improving read performance of a file using data pre-fetches, comprising:
    encoding an extent map identifying valid data of the file as extents, wherein the file is a holey file comprising the valid data interspersed with one or more holes constituting invalid data;
    storing the extent map in a network client executing an application, wherein the application produces a read request to access the file from storage, wherein extent map comprises a recipe consisting of a sequence of offsets, with each offset defining a corresponding extent;
    transferring, upon the read request, the extent map to a filesystem storing the file;
    bringing, in the filesystem, the extents from the extent map into memory ahead of the read request;
    calculating, using the recipe, extent-aware prefetch offsets that skip over the one or more holes so that the prefetch offsets always fall within an extent of valid data of the file; and
    generating pre-fetches of data on the file using the extent-aware prefetch offsets.

2. The method of claim 1 wherein the pre-fetches move data from a prefetched extents into a read-ahead cache to be sent to the application in response to the read request, and further wherein the prefetch comprises a hint that a read input/output (I/O) operation is imminent for purposes of filling the read-ahead cache and preventing a need to issue a blocking I/O operation for the read request.

3. The method of claim 2 wherein the filesystem includes a multi-streamed restore component providing multiple streams to issue read-ahead operations for the pre-fetches in parallel.

4. The method of claim 3 wherein the pre-fetches move the data into the read-ahead cache using the multiple streams.

5. The method of claim 1 wherein the recipe is stored by the application as part of a backup operation.

6. The method of claim 1 wherein the recipe is generated using differences between subsequent generations of backup operations processing the file.

7. The method of claim 1 wherein the storage comprises part of a deduplication backup process executed by a data storage server running a Data Domain filesystem (DDFS), and further wherein read requests requiring the pre-fetches of the data are sent through a common library software plug-in interface (DDBoost).

8. A computer-implemented method for improving read performance of a file using data pre-fetches, comprising:
    encoding an extent map identifying valid data of the file as extents in a recipe consisting of a sequence of offsets, with each offset defining a corresponding extent, wherein the valid data is interspersed with one or more holes constituting invalid data;
    storing the extent map in a network client executing an application, wherein the application produces a read request to access the file from storage;
    calculating, using the recipe, extent-aware prefetch offsets that skip over the one or more holes so that the prefetch offsets always fall within an extent of valid data of the file; and
    using, in the network client and upon the read request, the extent-aware prefetch offsets to generate prefetch requests and execute read-ahead operations on a filesystem storing the file; and
    generating pre-fetches of data on the file that avoid the one or more holes.

9. The method of claim 8 wherein the pre-fetches move data from a prefetched extents into a read-ahead cache to be sent to the application in response to the read request, and wherein the prefetch comprises a hint that a read input/output (I/O) operation is imminent for purposes of filling the read-ahead cache and preventing a need to issue a blocking I/O operation for the read request.

10. The method of claim 9 wherein the filesystem includes a multi-streamed restore component providing multiple streams to issue read-ahead operations for the pre-fetches in parallel.

11. The method of claim 10 wherein the pre-fetches move the data into the read-ahead cache using the multiple streams.

12. The method of claim 4 wherein the recipe is stored by the application as part of a backup operation.

13. The method of claim 12 wherein the recipe is generated using differences between subsequent generations of backup operations processing the file.

* * * * *